(12) United States Patent
Mochizuki et al.

(10) Patent No.: US 11,670,796 B2
(45) Date of Patent: Jun. 6, 2023

(54) ALL-SOLID STATE SECONDARY BATTERY, EXTERIOR MATERIAL FOR ALL-SOLID STATE SECONDARY BATTERY, AND METHOD FOR MANUFACTURING ALL-SOLID STATE SECONDARY BATTERY

(71) Applicant: FUJIFILM Corporation, Tokyo (JP)

(72) Inventors: Hiroaki Mochizuki, Kanagawa (JP); Masaomi Makino, Kanagawa (JP); Tomonori Mimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 169 days.

(21) Appl. No.: 16/813,746

(22) Filed: Mar. 10, 2020

(65) Prior Publication Data

US 2020/0212376 A1 Jul. 2, 2020

Related U.S. Application Data

(63) Continuation of application No. PCT/JP2018/032030, filed on Aug. 29, 2018.

(30) Foreign Application Priority Data

Sep. 13, 2017 (JP) .............................. JP2017-175610

(51) Int. Cl.
*H01M 10/04* (2006.01)
*H01M 10/0525* (2010.01)
(Continued)

(52) U.S. Cl.
CPC ..... *H01M 10/049* (2013.01); *H01M 10/0525* (2013.01); *H01M 50/121* (2021.01);
(Continued)

(58) Field of Classification Search
None
See application file for complete search history.

(56) References Cited

U.S. PATENT DOCUMENTS 8,146,924 B2 4/2012 Ohmi et al.
8,974,955 B2 3/2015 Min et al.
(Continued)

FOREIGN PATENT DOCUMENTS

CN 102683741 9/2012
CN 103201890 7/2013
(Continued)

OTHER PUBLICATIONS

"International Search Report (Form PCT/ISA/210) of PCT/JP2018/032030," dated Dec. 4, 2018, with English translation thereof, pp. 1-5.
(Continued)

*Primary Examiner* — Wyatt P Mcconnell
(74) *Attorney, Agent, or Firm* — JCIPRNET

(57) ABSTRACT

Provided are an all-solid state secondary battery including a positive electrode active material layer, a negative electrode active material layer, and a solid electrolyte layer and being coated with an exterior material layer, in which at least a part of the exterior material layer is a rubber-coating layer having a gas transmission coefficient of less than 40 cc·20 μm/m²·24 h·atm, an exterior material for an all-solid state secondary battery, and a method for manufacturing an all-solid state secondary battery.

14 Claims, 1 Drawing Sheet

(51) Int. Cl.
    *H01M 50/133*     (2021.01)
    *H01M 50/121*     (2021.01)
    *H01M 50/131*     (2021.01)
    *H01M 4/02*     (2006.01)

(52) U.S. Cl.
    CPC ....... *H01M 50/131* (2021.01); *H01M 50/133* (2021.01); *H01M 2004/027* (2013.01); *H01M 2004/028* (2013.01)

(56) References Cited

U.S. PATENT DOCUMENTS

| | | | |
|---|---|---|---|
| 9,647,256 | B2 | 5/2017 | Abe et al. |
| 9,853,274 | B2 | 12/2017 | Tanaka |
| 10,096,812 | B2 | 10/2018 | Abe et al. |
| 2010/0178553 | A1 | 7/2010 | Murata |
| 2011/0020730 | A1* | 1/2011 | Mizuno ................ B29C 55/143 429/479 |
| 2012/0135292 | A1* | 5/2012 | Buckingham ........ H01M 50/116 429/153 |
| 2012/0237834 | A1* | 9/2012 | Ogasa ............... H01M 10/0525 429/320 |
| 2014/0154532 | A1* | 6/2014 | Chellew .................... B25F 5/02 429/7 |
| 2015/0064514 | A1* | 3/2015 | Wu ...................... H01M 50/20 429/56 |
| 2017/0040644 | A1 | 2/2017 | Lupart et al. |

FOREIGN PATENT DOCUMENTS

| | | |
|---|---|---|
| CN | 103254633 | 8/2013 |
| CN | 105027344 | 11/2015 |
| DE | 102014207531 | 10/2015 |
| EP | 3039731 | 7/2016 |
| JP | S6460953 | 3/1989 |
| JP | 2000173564 | 6/2000 |
| JP | 2004199994 | 7/2004 |
| JP | 2006351326 | 12/2006 |
| JP | 2008192377 | 8/2008 |
| JP | 2008204754 | 9/2008 |
| JP | 2009019764 | 1/2009 |
| JP | 2010212062 | 9/2010 |
| JP | 2015103370 | 6/2015 |
| JP | 2015220099 | 12/2015 |
| JP | 2015220106 | 12/2015 |
| WO | 2012114497 | 8/2012 |

OTHER PUBLICATIONS

"International Preliminary Report on Patentability (Form PCT/IPEA/409) of PCT/JP2018/032030," completed on Dec. 2, 2019, with English translation thereof, pp. 1-13.

"Search Report of Europe Counterpart Application", dated Oct. 26, 2020, p. 1-p. 10.

Office Action of Korean Counterpart Application, with English translation thereof, dated Jul. 17, 2021, pp. 1-13.

"Notice of Reasons for Revocation of Japan Counterpart Application" with English translation thereof, dated Dec. 22, 2021, p. 1-p. 6.

"Office Action of China Counterpart Application", dated Oct. 9, 2022, with English translation thereof, p. 1-p. 17.

Zhang Dianrong et al., "Modern Rubber Formulation Design," Chemical Industry Press, Oct. 31, 2001, with concise explanation of relevance from English translation of First Office Action, pp. 1-2.

Fei Congrong et al., "Mechanical Manufacturing Engineering Training Course," Southwest Jiaotong University Press, Aug. 31, 2006, with concise explanation of relevance from English translation of First Office Action, pp. 1-6.

\* cited by examiner

ALL-SOLID STATE SECONDARY BATTERY, EXTERIOR MATERIAL FOR ALL-SOLID STATE SECONDARY BATTERY, AND METHOD FOR MANUFACTURING ALL-SOLID STATE SECONDARY BATTERY

CROSS-REFERENCE TO RELATED APPLICATIONS

This application is a Continuation of PCT International Application No. PCT/JP2018/032030 filed on Aug. 29, 2018, which claims priority under 35 U.S.C. § 119 (a) to Japanese Patent Application No. 2017-175610 filed in Japan on Sep. 13, 2017. Each of the above applications is hereby expressly incorporated by reference, in its entirety, into the present application.

BACKGROUND OF THE INVENTION

1. Field of the Invention

The present invention relates to an all-solid state secondary battery, an exterior material for an all-solid state secondary battery, and a method for manufacturing an all-solid state secondary battery.

2. Description of the Related Art

A lithium ion secondary battery is a storage battery which has a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short circuit and ignition may be caused in batteries due to overcharging or overdischarging, and there is a demand for additional improvement in safety and reliability.

Under such circumstances, all-solid state secondary batteries in which an inorganic solid electrolyte is used instead of the organic electrolytic solution are attracting attention. In all-solid state secondary batteries, all of the negative electrode, the electrolyte, and the positive electrode are solid, safety and reliability which are considered as a problem of batteries in which the organic electrolytic solution is used can be significantly improved, and it also becomes possible to extend the service lives. Furthermore, all-solid state secondary batteries can be provided with a structure in which the electrodes and the electrolyte are directly disposed in series. Therefore, it becomes possible to increase the energy density to be higher than that of secondary batteries in which the organic electrolytic solution is used, and thus the application to electric cars, large-sized storage batteries, and the like is anticipated.

Due to the respective advantages described above, active research and development is underway to put all-solid state secondary batteries into practical use as next-generation lithium ion batteries, and a number of techniques for improving the battery performance of all-solid state secondary batteries have been reported. For example, JP2015-220099A describes an all-solid state secondary battery having a water resistant layer and an elastic layer. This all-solid state secondary battery does not easily break even in the case of being dropped from a certain height and is regarded to be excellent in terms of water resistance. JP2010-212062A describes a battery system includes an all-solid state secondary battery and a coated layer as temperature buffering means for buffering the temperature of the all-solid state secondary battery. This battery system is regarded to be capable of stabilizing and improving an output characteristic using simple temperature buffering means.

SUMMARY OF THE INVENTION

As described above, all-solid state secondary batteries are anticipated to be mounted in vehicles such as electric cars. That is, all-solid state secondary batteries are demanded to, when actually mounted in a vehicle, be capable of stably maintaining voltage even in the case of continuously or repeatedly receiving vibrations during the travelling of the vehicle and be excellent in terms of a cycle characteristic.

In the all-solid state secondary battery described in JP2015-220099A, the modulus of elasticity of the elastic layer is too low, and thus there is a concern that, in a case in which the all-solid state secondary battery continuously receives vibrations, the battery performance may degrade. Regarding the battery system described in JP2010-212062A, the output characteristic is improved by controlling the temperature of the all-solid state secondary battery, and there is no description regarding performance degradation by vibration that the battery receives.

An object of the present invention is to provide an all-solid state secondary battery having a high discharge capacity density, having a voltage that does not easily drop even in the case of being actually mounted in a vehicle such as an electric car or an electric train and continuously receiving large or small vibrations during the travelling of the vehicle, and, furthermore, being excellent in terms of a cycle characteristic. In addition, another object of the present invention is to provide an exterior material for an all-solid state secondary battery capable of realizing an all-solid state secondary battery having a high discharge capacity density, having a voltage that does not easily drop even in the case of being actually mounted in a vehicle such as an electric car or an electric train and continuously receiving large or small vibrations during the travelling of the vehicle, and, furthermore, being excellent in terms of a cycle characteristic by being used as an exterior material layer of the all-solid state secondary battery. Furthermore, still another object of the present invention is to provide a method for manufacturing the all-solid state secondary battery.

As a result of a variety of studies, the present inventors attained the above-described objects using the following means.

<1> An all-solid state secondary battery comprising: a positive electrode active material layer; a negative electrode active material layer; and a solid electrolyte layer, in which the all-solid state secondary battery is coated with an exterior material layer, and at least a part of the exterior material layer is a rubber-coating layer having a gas transmission coefficient of less than 40 cc·20 μm/m²·24 h·atm.

<2> The all-solid state secondary battery according to <1>, in which a modulus of elasticity at 25° C. of rubber constituting the rubber-coating layer is 0.01 to 100 MPa.

<3> The all-solid state secondary battery according to <1> or <2>, in which a thickness of the exterior material layer is 1 to 100,000 μm.

<4> The all-solid state secondary battery according to any one of <1> to <3>, in which at least a part of a side surface is coated with the rubber-coating layer.

<5> The all-solid state secondary battery according to any one of <1> to <4>, in which a tensile strength at 25° C. of the rubber constituting the rubber-coating layer is 0.1 to 100 MPa.

<6> The all-solid state secondary battery according to any one of <1> to <5>, in which an inorganic solid electrolyte included in at least one layer of the positive electrode active material layer, the negative electrode active material layer, or the solid electrolyte layer (the positive electrode active material layer, the negative electrode active material layer, and/or the solid electrolyte layer) is a sulfide-based inorganic solid electrolyte.

<7> An exterior material for an all-solid state secondary battery comprising: a rubber-coating layer having a gas transmission coefficient of less than 40 cc·20 μm/m²·24 h·atm.

<8> A method for manufacturing the all-solid state secondary battery according to any one of <1> to <6>, the method comprising: a step of reducing a pressure in a space between a laminate having the positive electrode active material layer, the negative electrode active material layer, and the solid electrolyte layer, and an exterior material layer disposed around the laminate such that an end portion of the exterior material layer is adhered to the laminate to seal the all-state secondary battery in a state in which the exterior material layer and the laminate are closely attached to each other.

In the description of the present invention, numerical ranges expressed using "to" include numerical values before and after the "to" as the lower limit value and the upper limit value.

The all-solid state secondary battery of the present invention has a high discharge capacity density, has a voltage that does not easily drop even in the case of being actually mounted in a vehicle and continuously receiving large or small vibrations, and, furthermore, is excellent in terms of a cycle characteristic. In addition, the exterior material for an all-solid state secondary battery of the present invention is capable of realizing an all-solid state secondary battery having a high discharge capacity density, having a voltage that does not easily drop even in the case of being actually mounted in a vehicle and continuously receiving large or small vibrations, and, furthermore, being excellent in terms of a cycle characteristic by being used as an exterior material layer of the all-solid state secondary battery. Furthermore, the method for manufacturing the all-solid state secondary battery of the present invention is capable of manufacturing the all-solid state secondary battery having excellent performance.

DESCRIPTION OF THE PREFERRED EMBODIMENTS

<All-Solid State Secondary Battery>

An all-solid state secondary battery of an embodiment of the present invention includes a positive electrode active material layer, a negative electrode active material layer, and a solid electrolyte layer and is coated with an exterior material layer. At least a part of the exterior material layer is a rubber-coating layer having a gas transmission coefficient of less than 40 cc·20 μm/m²·24 h·atm.

Hereinafter, an all-solid state secondary battery according to a preferred embodiment of the present invention will be described using an example with reference to FIG. 1. Forms illustrated in the respective drawings are schematic views for easy understanding of the present invention, there will be cases in which the sizes, relative dimensional relationships, and the like of individual members are dimensionally changed for convenience, and the drawings do not illustrate actual relationships as they are. In addition, matters other than those defined by the present invention are not limited to outer forms and shapes illustrated in these drawings.

Figure 1:
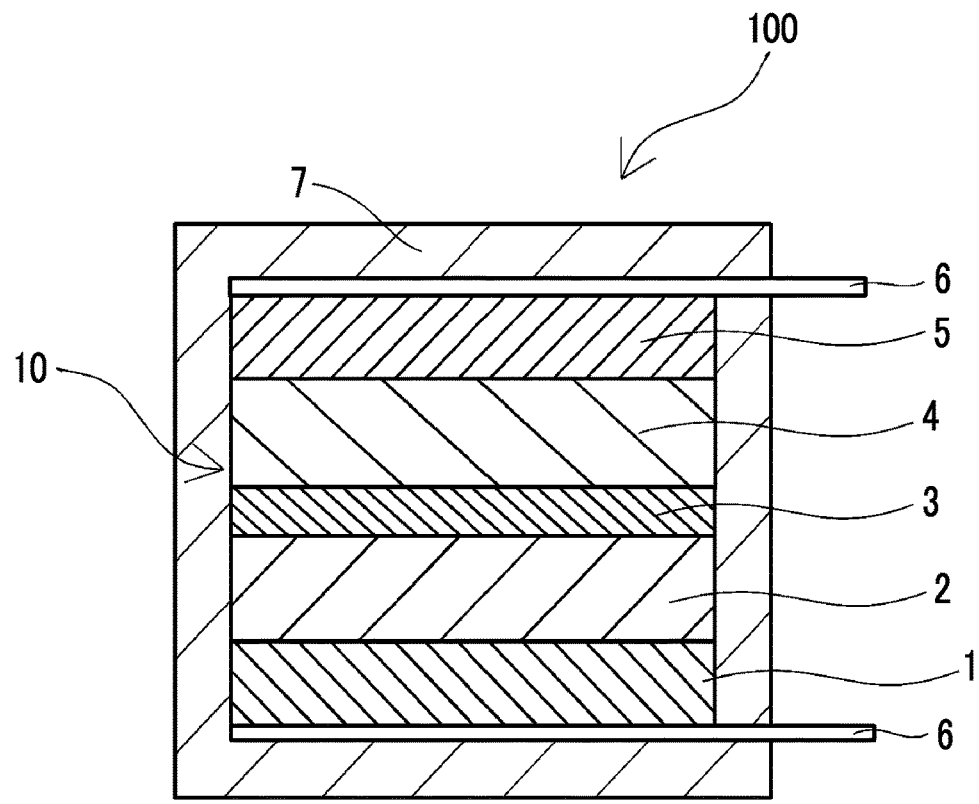
FIG. 1 is a vertical cross-sectional view schematically illustrating an all-solid state secondary battery according to a preferred embodiment of the present invention.

FIG. 1 is a cross-sectional view schematically illustrating a substantially cubic all-solid state secondary battery (lithium ion secondary battery) according to the preferred embodiment of the present invention. In an all-solid state secondary battery 100 of the present embodiment, all side surfaces of an all-solid state secondary battery laminate 10 having a negative electrode collector 1, a negative electrode active material layer 2, a solid electrolyte layer 3, a positive electrode active material layer 4, and a positive electrode collector 5 in this order from a negative electrode side and part of collecting terminals 6 provided in contact with the all-solid state secondary battery laminate 10 are coated with an exterior material layer 7. The respective layers are in contact with one another and have a laminated structure. In a case in which the above-described structure is employed, during charging, electrons (e⁻) are supplied to the negative electrode side, and lithium ions (Li⁺) are accumulated on the negative electrode side. On the other hand, during discharging, the lithium ions (Li⁺) accumulated on the negative electrode return to the positive electrode side, and the electrons are supplied to an operation portion (not illustrated) through the collecting terminal 6.

One side surface formed by the negative electrode collector 1 and the negative electrode active material layer 2, one side surface of the solid electrolyte layer 3 on the above-described side surface, and one side surface formed by the positive electrode collector 5 and the positive electrode active material layer 4 on the above-described side surface are collectively regarded as "one side surface" of the all-solid state secondary battery laminate 10. The all-solid state secondary battery laminate 10 has four side surfaces described above. That is, one side surface in a lamination direction of the laminate made up of the negative electrode collector 1, the negative electrode active material layer 2, the solid electrolyte layer 3, the positive electrode active material layer 4, and the positive electrode collector 5 is the "one side surface", and this laminate is substantially a cube and thus has four side surfaces. In addition, a surface of the collecting terminal 6 opposite to the positive electrode collector 5 (in a case in which the collecting terminal 6 is not provided, a surface of the positive electrode collector 5 opposite to the solid electrolyte layer 3) will be referred to as the upper surface, and a surface of the collecting terminal 6 opposite to the negative electrode collector 1 (in a case in which the collecting terminal 6 is not provided, a surface of the negative electrode collector 1 opposite to the solid electrolyte layer 3) will be referred to as the lower surface.

The shape of the all-solid state secondary battery of the embodiment of the present invention is not limited to the shape of the all-solid state secondary battery illustrated in FIG. 1 as long as the effect of the present invention is not impaired. Specific examples of a shape that the all-solid state secondary battery of the embodiment of the present invention is capable of employing include ordinary shapes of all-solid state secondary batteries such as an n-gonal prism shape (n is an integer of 3 to 20), a substantially n-gonal prism shape (n is an integer of 3 to 20), and a disc shape.

n-gonal prism-shaped and substantially n-gonal prism-shaped all-solid state secondary batteries have n side surfaces described above.

Figure 2:
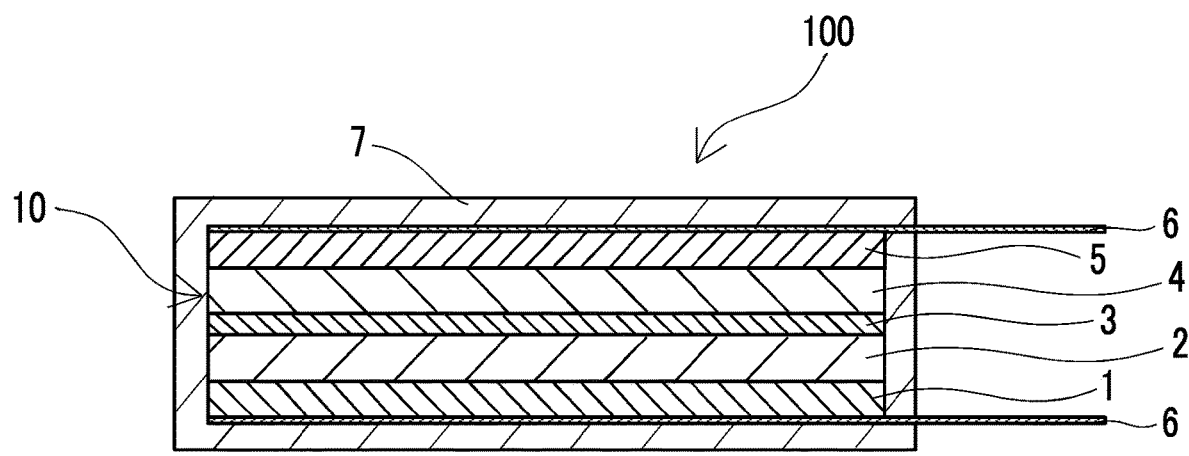
FIG. 2 is a vertical cross-sectional view schematically illustrating another all-solid state secondary battery according to a preferred embodiment of the present invention.

FIG. 2 is a vertical cross-sectional view schematically illustrating a disc-shaped all-solid state secondary battery (coin battery) according to the preferred embodiment of the present invention. This all-solid state secondary battery is the same as the all-solid state secondary battery of FIG. 1 except for the fact that the shape is a disc shape.

The thicknesses of the positive electrode active material layer 4, the solid electrolyte layer 3, and the negative electrode active material layer 2 are not particularly limited. Meanwhile, in a case in which the dimensions of ordinary batteries are taken into account, the thicknesses are preferably 10 to 1,000 μm and more preferably 20 μm or more and less than 500 μm. In the all-solid state secondary battery of the embodiment of the invention, the thickness of at least one layer of the positive electrode active material layer 4, the solid electrolyte layer 3, or the negative electrode active material layer 2 is still more preferably 50 μm or more and less than 500 μm.

In addition, the thickness of the exterior material layer 7 is not particularly limited, but the lower limit is preferably 1 μm or more, more preferably 5 μm or more, still more preferably 10 μm or more, and particularly preferably 50 μm or more. The upper limit is preferably 100,000 μm or less, more preferably 50,000 μm or less, still more preferably 20,000 μm or less, far still more preferably 5,000 μm or less, and far still more preferably 200 μm or less. In addition, the thickness of the rubber-coating layer is not particularly limited, but the lower limit is preferably 1 μm or more, more preferably 5 μm or more, still more preferably 10 μm or more, and particularly preferably 50 μm or more. The upper limit is preferably 100,000 μm or less, more preferably 50,000 μm or less, still more preferably 20,000 μm or less, far still more preferably 5.000 Lm or less, and far still more preferably 200 μm or less.

In a case in which the thickness of the exterior material layer 7 or the rubber-coating layer is in the above-described range, it is possible to effectively suppress an impact on the battery even in the case of continuously receiving vibrations, and it is possible to maintain the discharge capacity density as a battery on a higher level. In a case in which "the thickness of the exterior material layer 7" or "the thickness of the rubber-coating layer" is not uniform, the thickness is the average value (arithmetic average value).

At least a part of the exterior material layer 7 is a rubber-coating layer having a gas transmission coefficient of less than 40 cc·20 μm/m$^2$·24 h·atm. Here, the expression "at least a part of the exterior material layer 7 is a rubber-coating layer having a gas transmission coefficient of less than 40 cc·20 μm/m$^2$·24 h·atm" means that the exterior material layer has the rubber-coating layer in any portion. The portion having the rubber-coating layer is not particularly limited; however, in the case of coating the all-solid state secondary battery laminate 10, the portion is preferably a portion in which the rubber-coating layer coats any of a side surface (an end surface on which a lamination interface of two layers of the positive electrode active material layer, the negative electrode active material layer, and the solid electrolyte layer appears), an upper surface, or a lower surface. An aspect of the exterior material layer having the rubber-coating layer is not particularly limited, and, an aspect in which a part of the exterior material layer is substituted with the rubber-coating layer, an aspect in which at least one layer of multiple layers forming the exterior material layer is the rubber-coating layer, or an aspect that is a combination of the above-described aspects is exemplified.

Among surfaces of the all-solid state secondary battery laminate, a portion that is coated with the rubber-coating layer is not particularly limited, and examples thereof include the following forms.

(1) A form in which an upper surface, a lower surface, and n side surfaces of an all-solid state secondary battery laminate having n side surfaces are coated with the rubber-coating layer.

A form in which an upper surface, a lower surface, and a side surface of a disc-shaped all-solid state secondary battery laminate are coated with the rubber-coating layer.

In the forms in (1), all of the surfaces of the all-solid state secondary battery laminate are coated with the rubber-coating layer.

(2) A form in which at least one of an upper surface or a lower surface of an all-solid state secondary battery laminate having n side surfaces and a disc-shaped all-solid state secondary battery laminate is coated with the rubber-coating layer.

(3) A form in which at least one side surface of n side surfaces of an all-solid state secondary battery laminate having n side surfaces is coated with the rubber-coating layer (the number of side surfaces to be coated is preferably large).

For example, in an all-solid state secondary battery laminate having four side surfaces, one side surface is preferably coated with the rubber-coating layer, two side surfaces are more preferably coated with the rubber-coating layer, three side surfaces are still more preferably coated with the rubber-coating layer, and four side surfaces are particularly preferably coated with the rubber-coating layer. In an all-solid state secondary battery laminate having five side surfaces, one side surface is preferably coated with the rubber-coating layer, two side surfaces are more preferably coated with the rubber-coating layer, three side surfaces are still more preferably coated with the rubber-coating layer, four side surfaces are still more preferably coated with the rubber-coating layer, and five side surfaces are particularly preferably coated with the rubber-coating layer. In an all-solid state secondary battery laminate having six side surfaces, one side surface is preferably coated with the rubber-coating layer, two side surfaces are more preferably coated with the rubber-coating layer, three side surfaces are still more preferably coated with the rubber-coating layer, four side surfaces are still more preferably coated with the rubber-coating layer, five side surfaces are still more preferably coated with the rubber-coating layer, and six side surfaces are particularly preferably coated with the rubber-coating layer. This will also be true for (4) described below.

A form in which, in a disc-shaped all-solid state secondary battery laminate, at least a part of a side surface is fully coated with the rubber-coating layer in the lamination direction (the area of the side surface to be coated is preferably large).

In (3), in the all-solid state secondary battery laminate having n side surfaces and the disc-shaped all-solid state secondary battery laminate, in the total area of the side surfaces, 10 to 100% is preferably coated with the rubber-coating layer, 15 to 100% is more preferably coated with the rubber-coating layer, 20 to 100% is still more preferably coated with the rubber-coating layer, 40 to 100% is still more preferably coated with the rubber-coating layer, 60 to 100% is still more preferably coated with the rubber-coating layer, 80 to 100% is still more preferably coated with the rubber-coating layer, and the total area of the side surfaces is particularly preferably coated with the rubber-coating layer.

(4) A form in which, in an all-solid state secondary battery laminate having n side surfaces, on at least one side surface of the n side surfaces, side surfaces of the negative electrode collector and the positive electrode collector are not coated with the rubber-coating layer and side surfaces of the positive electrode active material layer, the solid electrolyte layer, and the negative electrode active material layer are coated with the rubber-coating layer (in this form, the number of the side surfaces to be coated with the rubber-coating layer is preferably large).

A form in which, in a disc-shaped all-solid state secondary battery laminate, on at least a part of a side surface, side surfaces of the negative electrode collector and the positive electrode collector are not coated with the rubber-coating layer and side surfaces of the positive electrode active material layer, the solid electrolyte layer, and the negative electrode active material layer are coated with the rubber-coating layer (in this form, the number of the side surfaces to be coated with the rubber-coating layer is preferably large).

In (4), in the all-solid state secondary battery laminate having n side surfaces and the disc-shaped all-solid state secondary battery laminate, in the total area of the side surfaces except for the side surfaces of the negative electrode collector and the positive electrode collector, 10 to 100% is preferably coated with the rubber-coating layer, 15 to 100% is more preferably coated with the rubber-coating layer, 20 to 100% is still more preferably coated with the rubber-coating layer, 40 to 100%/o is still more preferably coated with the rubber-coating layer, 60 to 100% is still more preferably coated with the rubber-coating layer, 80 to 100% is still more preferably coated with the rubber-coating layer, and the total area of the side surfaces is particularly preferably coated with the rubber-coating layer.

(5) A form in which, in an all-solid state secondary battery laminate having n side surfaces and a disc-shaped all-solid state secondary battery laminate, an upper surface or a lower surface and side surfaces are coated with the rubber-coating layer.

In the forms of (1) to (5), the rubber-coating layer is preferably used so as to absorb vibrations. That is, for example, in a case in which vibrations are transferred through a member, this member and the rubber-coating layer are preferably in contact with each other.

Among the above-described forms, (1), (3), and (4) are particularly preferred. This is because the intrusion of gas from a lamination interface formed by two layers of the negative electrode active material layer 2, the solid electrolyte layer 3, and the positive electrode active material layer 4 is effectively prevented, whereby it is possible to suppress performance degradation by the contact with the gas, that is, a decrease in voltage and the degradation of a cycle characteristic.

From the viewpoint of suppressing the intrusion of gas from the lamination interface, in the all-solid state secondary battery of the embodiment of the present invention, in the side surfaces of the all-solid state secondary battery laminate, at least all of portions except for the side surfaces of the negative electrode collector and the positive electrode collector are preferably coated with the rubber-coating layer.

In the all-solid state secondary battery of the embodiment of the present invention, all of the exterior material layer is preferably the rubber-coating layer.

(Exterior Material Layer)

As described above, a part of the exterior material layer 7 is formed of the rubber-coating layer. Hereinafter, the rubber-coating layer and rubber constituting the rubber-coating layer will be described.

The gas transmission coefficient of rubber that is used in the present invention is less than 40 cc·20 m/m$^2$·24 h·atm. The lower limit of the gas transmission coefficient of rubber is not particularly limited; however, realistically, 0.1 cc·20 μm/m$^2$·24 h·atm or more. The gas transmission coefficient is a value obtained by a measurement method described in examples.

The rubber-coating layer may include a component other than the rubber as long as the effect of the present invention is not impaired. The content of the rubber in the rubber-coating layer is preferably 20% by mass or more and more preferably 50% by mass or more and may be 100% by mass.

The modulus of elasticity at 25° C. of the rubber that is used in the present invention is preferably 0.01 to 100 MPa, more preferably 0.05 to 80 MPa, still more preferably 0.1 to 50 MPa, and particularly preferably 0.5 to 5 MPa. The modulus of elasticity of the rubber that is used in the present invention is a value obtained by a measurement method described in the examples.

Since, even in a case in which the all-solid state secondary battery continuously receives vibrations, the rubber-coating layer does not break, and an impact on the battery can be suppressed, the tensile strength at 25° C. of the rubber that is used in the present invention is preferably 0.1 to 100 MPa, more preferably 0.5 to 80 MPa, and particularly preferably 1 to 50 MPa. The tensile strength of the rubber that is used in the present invention is a value obtained by a measurement method described in the examples.

As the rubber that is used in the present invention, among isoprene rubber, butadiene rubber, styrene-butadiene rubber, butyl rubber, chlorinated butyl rubber, nitrile rubber, nitrile-butadiene rubber, ethylene·propylene rubber, ethylene·propylene diene rubber, chloroprene rubber, alkyl rubber, chlorosulfonated polyethylene rubber, urethane rubber, silicone rubber, fluorine rubber, ethylene·vinyl acetate rubber, epichlorohydrin rubber, polysulfide rubber, and the like, rubber at least having a gas transmission coefficient of less than 40 cc·20 μm/m$^2$·24 h·atm can be used. In the present invention, butyl rubber is preferably used.

It is also possible to use rubber having a gas transmission coefficient that is set to less than 40 cc·20 μm/m$^2$·24 h·atm by complexing the above-described rubber as a base material using a variety of fillers or the like.

The rubber that is used in the present invention may be used singly or two or more kinds of rubber may be used in combination.

The exterior material layer 7 may be a single layer or a multiple layer. In addition, the exterior material layer 7 may be in contact with at least one of the all-solid state secondary battery laminate 10 or the collector terminal 6 or may coat at least one of the all-solid state secondary battery laminate 10 or the collector terminal 6 through an adhesive layer.

A component constituting a portion of the exterior material layer 7 other than the rubber-coating layer is not particularly limited, and examples thereof include a variety of metals such as stainless steel, a variety of plastic sheets such as a PET film, and complex sheets such as a PET film having an aluminum-deposited layer.

In addition, the form of coating is also not limited to the form illustrated in FIG. 1, and, for example, a form in which a stainless steel pipe and a rubber stopper made of the rubber forming the rubber-coating layer are combined together to produce an exterior material layer and coat the all-solid state secondary battery laminate and the collecting terminals is also included in the all-solid state secondary battery of the embodiment of the present invention.

An exterior material for an all-solid state secondary battery of an embodiment of the present invention has the rubber-coating layer, and a shape thereof is not particularly limited. As the shape, for example, a sheet, a cube, a cuboid, and the like are exemplified.

<Method for Manufacturing all-Solid State Secondary Battery>

A method for manufacturing an all-solid state secondary battery of an embodiment of the present invention is not particularly limited. Hereinafter, a preferred form of the method for manufacturing an all-solid state secondary battery of the embodiment of the present invention will be described.

—Production of all-Solid State Secondary Battery Laminate 10—

As the all-solid state secondary battery laminate 10, an all-solid state secondary battery that is ordinarily used as an all-solid state secondary battery laminate can be broadly used, and the all-solid state secondary battery can be produced using an ordinary method.

—Sealing of all-Solid State Secondary Battery Laminate 10—

The all-solid state secondary battery laminate 10 is sandwiched by two layers of an outer layer materials (for example, rubber sheets) having an adhesive layer from an upper surface side and a lower surface side, and the outside environment pressure of this laminate is reduced. The adhesive layers on end portions of the rubber sheets are adhered to each other in a pressure-reduced state, thereby sealing the laminate.

Specifically, for example, the adhesive layer of the rubber sheet having the adhesion layer is brought into contact with a part of the negative electrode-side collecting terminal 6 and the negative electrode collector 1. On the other hand, the other rubber sheet having an adhesive layer is brought into contact with a part of the positive electrode-side collecting terminal 6 and the positive electrode collector 5. The all-solid state secondary battery laminate 10 is sandwiched as described above. In a state in which pressure is applied from both sides of the negative electrode and the positive electrode to the all-solid state secondary battery laminate in a sandwiched state, the pressure is reduced through a side surface side that does not overlap the collectors, and the rubber sheets having the adhesive layers that overlap each other are adhered to each other, whereby it is possible to seal the all-solid state secondary battery laminate 10.

An all-solid state secondary battery having a shape other than the shape illustrated in FIG. 1 can also be produced in the same manner.

(Constituent Components of all-Solid State Secondary Battery Laminate)

The negative electrode active material layer 2 includes at least an inorganic solid electrolyte and a negative electrode active material and may include a binder. The solid electrolyte layer 3 includes at least an inorganic solid electrolyte and may include a binder. The positive electrode active material layer 4 includes at least inorganic solid electrolyte and a positive electrode active material and may include a binder.

(Inorganic Solid Electrolyte)

The inorganic solid electrolyte is an inorganic solid electrolyte, and the solid electrolyte refers to a solid-form electrolyte capable of migrating ions therein. The inorganic solid electrolyte is clearly differentiated from organic solid electrolytes (polymer electrolytes represented by polyethylene oxide (PEO) or the like and organic electrolyte salts represented by lithium bis(trifluoromethanesulfonyl)imide (LiTFSI)) since the inorganic solid electrolyte does not include any organic substances as a principal ion-conductive material. In addition, the inorganic solid electrolyte is a solid in a static state and thus, generally, is not disassociated or liberated into cations and anions. Due to this fact, the inorganic solid electrolyte is also clearly differentiated from inorganic electrolyte salts of which cations and anions are disassociated or liberated in electrolytic solutions or polymers ($LiPF_6$, $LiBF_4$, LiFSI, LiCl, and the like). The inorganic solid electrolyte is not particularly limited as long as the inorganic solid electrolyte has conductivity of ions of metals belonging to Group I or II of the periodic table and is generally a substance having no electron conductivity.

In the present invention, the inorganic solid electrolyte has conductivity of ions of metals belonging to Group I or II of the periodic table. As the inorganic solid electrolyte, it is possible to appropriately select and use solid electrolyte materials that are applied to this kind of products. Typical examples of the inorganic solid electrolyte include (i) sulfide-based inorganic solid electrolytes and (ii) oxide-based inorganic solid electrolytes. In the present invention, the sulfide-based inorganic solid electrolytes are preferably used since it is possible to form a more favorable interface between the active material and the inorganic solid electrolyte.

(i) Sulfide-Based Inorganic Solid Electrolytes

Sulfide-based inorganic solid electrolytes are preferably compounds which contain sulfur atoms (S), have ion conductivity of metals belonging to Group I or II of the periodic table, and have electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases.

Examples thereof include lithium ion-conductive inorganic solid electrolytes satisfying a composition represented by Formula (I).

$$L_{a1}M_{b1}P_{c1}S_{d1}A_{e1} \qquad \text{Formula (I)}$$

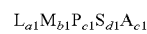

In the formula, L represents an element selected from Li, Na, and K and is preferably Li. M represents an element selected from B, Zn, Sn, Si, Cu, Ga, Sb, Al, and Ge. A represents an element selected from I, Br, Cl, and F. a1 to e1 represent the compositional ratios among the respective elements, and a1:b1:c1:d1:e1 satisfies 1 to 12:0 to 5:1:2 to 12:0 to 10. Furthermore, a1 is preferably 1 to 9 and more preferably 1.5 to 7.5. b1 is preferably 0 to 3 and more preferably 0 to 1. Furthermore, d1 is preferably 2.5 to 10 and more preferably 3.0 to 8.5. Furthermore, e1 is preferably 0 to 5 and more preferably 0 to 3.

The compositional ratios among the respective elements can be controlled by adjusting the amounts of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P. and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio between $Li_2S$ and $P_2S_5$ in Li—P—S-based glass and Li—P—S-based glass ceramic is preferably 60:40 to 90:10 and more preferably 68:32 to 78:22 in terms of the molar ratio between $Li_2S:P_2S_5$. In a case in which the ratio between $Li_2S$ and $P_2S_5$ is set in the above-described range, it is possible to increase the lithium ion conductivity. Specifically, the lithium ion conductivity can be preferably set to $1 \times 10^{-4}$ S/cm or more and more preferably set to $1 \times 10^{-3}$ S/cm or more. The upper limit is not particularly limited, but realistically $1 \times 10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, $Li_{10}GeP_2S_{12}$, and the like. Mixing ratios of the respective raw materials do not matter. Examples of a method for synthesizing sulfide-based inorganic solid electrolyte materials using the above-described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolytes

Oxide-based inorganic solid electrolytes are preferably compounds which contain oxygen atoms (O), have an ion conductivity of metals belonging to Group I or II of the periodic table, and have electron-insulating properties.

Specific examples of the compounds include $Li_{xa}La_{ya}TiO_3$ [xa=0.3 to 0.7 and ya=0.3 to 0.7] (LLT), $Li_{xb}La_{yb}Zr_{zb}M^{bb}O_{nb}$ ($M^{bb}$ is at least one element of Al, Mg, Ca, Sr, V, Nb, Ta, Ti, Ge, In or Sn, xb satisfies 5≤xb≤10, yb satisfies 1≤yb≤4, zb satisfies 1≤zb≤4, mb satisfies 0≤mb≤2, and nb satisfies 5≤nb≤20.), $Li_{xc}B_{yc}M^{cc}O_{nc}$ ($M^{cc}$ is at least one element of C, S, Al, Si, Ga, Ge, In, or Sn, xc satisfies 0≤xc≤5, yc satisfies 0≤yc≤1, zc satisfies 0≤zc≤1, and nc satisfies 0≤nc≤6), $Li_{xd}(Al, Ga)_{yd}(Ti, Ge)_{zd}Si_{nd}P_{md}O_{nd}$ (1≤xd≤3, 0≤yd≤1, 0≤zd≤2, 0≤ad≤1, 1≤md≤7, 3≤nd≤13), $Li_{(3-2xe)}M^{ee}_{xe}D^{ee}O$ (xe represents a number of 0 or more and 0.1 or less, and $M^{ee}$ represents a divalent metal atom. $D^{ee}$ represents a halogen atom or a combination of two or more halogen atoms.), $Li_{xf}Si_{yf}O_{zf}$ (1≤xf≤5, 0≤yf≤3, 1≤zf≤10), $Li_{xg}S_{yg}O_{zg}$ (1≤xg≤3, 0<yg≤2, 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w<1), $Li_{3.5}Zn_{0.25}GeO_4$ having a lithium super ionic conductor (LISICON)-type crystal structure, $La_{0.55}Li_{0.35}TiO_3$ having a perovskite-type crystal structure, $LiTi_2P_3O_{12}$ having a natrium super ionic conductor (NASICON)-type crystal structure, $Li_{1+xh+yh}(Al, Ga)_{xh}(Ti, Ge)_{2-xh}Si_{yh}P_{3-yh}O_{12}$ (0≤xh≤1, 0≤yh≤1), $Li_7La_3Zr_2O_{12}$ (LLZ) having a garnet-type crystal structure. In addition, phosphorus compounds containing Li, P and O are also desirable. Examples thereof include lithium phosphate ($Li_3PO_4$), LiPON in which some of oxygen atoms in lithium phosphate are substituted with nitrogen, $LiPOD^1$ ($D^1$ is at least one element selected from Ti, V, Cr, Mn, Fe, Co, Ni, Cu, Zr, Nb, Mo, Ru, Ag, Ta, W, Pt, Au, or the like), and the like. It is also possible to preferably use $LiA^1ON$ ($A^1$ represents at least one element selected from Si, B, Ge, Al, C, Ga, or the like) and the like.

The volume-average particle diameter of the inorganic solid electrolyte is not particularly limited, but is preferably 0.01 μm or more and more preferably 0.1 μm or more. The upper limit is preferably 100 μm or less and more preferably 50 μm or less. Meanwhile, the average particle diameter of the inorganic solid electrolyte particles is measured in the following order. One percent by mass of a dispersion liquid is prepared through dilution and adjustment using the inorganic solid electrolyte particles and water (heptane in a case in which the inorganic solid electrolyte is unstable in water) in a 20 ml sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (manufactured by Horiba Ltd.), and a silica cell for measurement at a temperature of 25° C., thereby obtaining the volume-average particle diameter. Regarding other detailed conditions and the like, the description of JIS Z8828:2013 "Particle size analysis-Dynamic light scattering method" is referred to as necessary. Five specimens are produced and measured per level, and the average values thereof are employed.

In a case in which a decrease in the interface resistance and the maintenance of the decreased interface resistance in the case of being used in the all-solid state secondary battery are taken into account, the content of the inorganic solid electrolyte in the negative electrode active material layer 2, the solid electrolyte layer 3, or the positive electrode active material layer 4 is preferably 5% by mass or more, more preferably 10% by mass or more, and particularly preferably 20% by mass or more. From the same viewpoint, the upper limit is preferably 99.9% by mass or less, more preferably 99.5% by mass or less, and particularly preferably 99% by mass or less.

However, regarding the content of the inorganic solid electrolyte in the negative electrode active material layer 2 and the positive electrode active material layer 4, the total content of an active material and the inorganic solid electrolyte is preferably in the above-described range.

These inorganic solid electrolytes may be used singly or two or more inorganic solid electrolytes may be used in combination.

(Active Material)

As the active material, a positive electrode active material and a negative electrode active material are exemplified, and a transition metal oxide and a sulfur-containing compound that is the positive electrode active material and lithium titanate, graphite, metallic lithium, and a compound that can be alloyed with lithium that are the negative electrode active material are preferred.

—Positive Electrode Active Material—

The positive electrode active material is preferably an active material capable of intercalating and deintercalating lithium ions. The above-described material is not particularly limited as long as the material has the above-described characteristics and may be transition metal oxides, organic substances, elements capable of being complexed with Li such as sulfur, complexes of sulfur and metal, or the like.

Among these, as the positive electrode active material, transition metal oxides are preferably used, and transition metal oxides having a transition metal element $M^a$ (one or more elements selected from Co, Ni, Fe, Mn, Cu, and V) are more preferred. In addition, an element $M^b$ (an element of Group I (Ia) of the metal periodic table other than lithium, an element of Group II (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. The positive electrode active material is more preferably synthesized by mixing the element into the transition metal oxide so that the molar ratio of Li/$M^a$ reaches 0.3 to 2.2.

Specific examples of the transition metal oxides include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNiO_2$ (lithium nickelate). $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ (lithium iron phosphate [LFP] and $Li_3Fe_2(PO_4)_3$, iron pyrophosphates such as $LiFeP_2O_7$, and cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

The shape of the positive electrode active material is not particularly limited, but is preferably a particle shape. The volume-average particle diameter (circle-equivalent average particle diameter) of positive electrode active material particles is not particularly limited. For example, the volume-average particle diameter can be set to 0.1 to 50 μm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The volume-average particle diameter (circle-equivalent average particle diameter) of positive electrode active material particles can be measured using a laser diffraction/scattering-type particle size distribution measurement instrument LA-920 (trade name, manufactured by Horiba Ltd.).

The positive electrode active material may be used singly or two or more positive electrode active materials may be used in combination.

In the case of forming a positive electrode active material layer, the mass (mg) of the positive electrode active material per unit area ($cm^2$) of the positive electrode active material layer (weight per unit area) is not particularly limited and can be appropriately determined depending on the set battery capacity.

The content of the positive electrode active material in the positive electrode active material layer 4 is not particularly limited, but is preferably 10% to 99% by mass, more preferably 30% to 98% by mass, still more preferably 50% to 97% by mass, and particularly preferably 55% to 95% by mass.

—Negative Electrode Active Material—

The negative electrode active material is preferably an active material capable of intercalating and deintercalating lithium ions. The above-described material is not particularly limited as long as the material has the above-described characteristics, and examples thereof include carbonaceous materials, metal oxides such as tin oxide, silicon oxide, metal complex oxides, a lithium single body, lithium alloys such as lithium aluminum alloys, metals capable of forming alloys with lithium such as Sn, Si, Al, and In and the like. Among these, carbonaceous materials or metal complex oxides are preferably used in terms of reliability. In addition, the metal complex oxides are preferably capable of absorbing and deintercalating lithium. The materials are not particularly limited, but preferably contain at least one of titanium or lithium as constituent components from the viewpoint of high-current density charging and discharging characteristics.

The carbonaceous material that is used as the negative electrode active material is a material substantially consisting of carbon. Examples thereof include petroleum pitch, carbon black such as acetylene black (AB), graphite (natural graphite, artificial graphite such as highly oriented pyrolytic graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, flat graphite, and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which CuKa rays are used and may have crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Bi_2O_4$, $SnSiO_3$, GeS, SnS, $SnS_2$, PbS, $PbS_2$, $Sb_2S_3$, $Sb_2S_5$, and $SnSiS_3$. In addition, these amorphous oxides may be complex oxides with lithium oxide, for example, $Li_2SnO_2$.

The negative electrode active material preferably contains a titanium atom. More specifically, $Li_4Ti_5O_{12}$ (lithium titanium oxide [LTO]) is preferred since the volume fluctuation during the absorption and deintercalation of lithium ions is small, and thus the high-speed charging and discharging characteristics are excellent, and the deterioration of electrodes is suppressed, whereby it becomes possible to improve the service lives of lithium ion secondary batteries.

In the present invention, a Si-based negative electrode is also preferably applied. Generally, a Si negative electrode is capable of absorbing a larger number of Li ions than a carbon negative electrode (graphite, acetylene black, or the like). That is, the amount of Li ions absorbed per unit mass increases. Therefore, it is possible to increase the battery capacity. As a result, there is an advantage that the battery driving duration can be extended.

The shape of the negative electrode active material is not particularly limited, but is preferably a particle shape. The average particle diameter of the negative electrode active material is preferably 0.1 to 60 μm. In order to provide a predetermined particle diameter, an ordinary crusher or classifier is used. For example, a mortar, a ball mill, a sand mill, an oscillatory ball mill, a satellite ball mill, a planetary ball mill, a revolving airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out. The average particle diameter of negative electrode active material particles can be measured using the same method as the method for measuring the volume-average particle diameter of the positive electrode active material.

The chemical formulae of the compounds obtained using a firing method can be computed using an inductively coupled plasma (ICP) emission spectroscopic analysis method as a measurement method from the mass difference of powder before and after firing as a convenient method.

The negative electrode active material may be used singly or two or more negative electrode active materials may be used in combination.

In the case of forming the negative electrode active material layer, the mass (mg) of the negative electrode active material per unit area ($cm^2$) of the negative electrode active material layer (weight per unit area) is not particularly limited. The weight per unit area of the negative electrode active material can be appropriately determined depending on a designed battery capacity.

The content of the negative electrode active material in the negative electrode active material layer 2 is not particularly limited, but is preferably 10% to 100% by mass and more preferably 20% to 100% by mass.

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, lithium niobate-based compounds, and the like, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, $B_2O_3$, and the like.

In addition, a surface treatment may be carried out on the surfaces of electrodes including the positive electrode active material or the negative electrode active material using sulfur, phosphorous, or the like.

Furthermore, the particle surfaces of the positive electrode active material or the negative electrode active material may be treated with an active light ray or an active gas (plasma or the like) before or after the coating of the surfaces.

(Binder (D))

The negative electrode active material layer 2, the solid electrolyte layer 3, and the positive electrode active material layer 4 may contain a binder and preferably may contain a polymer particle.

The binder that is used in the present invention is not particularly limited as long as the binder is an organic polymer.

A binder that can be used in the present invention is not particularly limited, and, for example, a binder made of a resin described below is preferred.

Examples of a fluorine-containing resin include polytetrafluoroethylene (PTFE), polyvinylene difluoride (PVdF), and copolymers of polyvinylene difluoride and hexafluoropropylene (PVdF-HFP).

Examples of a hydrocarbon-based thermoplastic resin include polyethylene, polypropylene, styrene butadiene rubber (SBR), hydrogenated styrene butadiene rubber (HSBR), butylene rubber, acrylonitrile butadiene rubber, polybutadiene, and polyisoprene.

Examples of an acrylic resin include a variety of (meth)acrylmonomers, (meth)acrylamide monomers, and copolymers of monomers constituting these resins (preferably copolymers of acrylic acid and methyl acrylate).

In addition, copolymers with other vinyl-based monomers are also preferably used. Examples thereof include copolymers of methyl (meth)acrylate and styrene, copolymers of methyl (meth)acrylate and acrylonitrile, and copolymers of butyl (meth)acrylate, acrylonitrile, and styrene. In the present specification, a copolymer may be any of a statistic copolymer and a periodic copolymer and is preferably a blocked copolymer.

Examples of other resins include a polyurethane resin, a polyurea resin, a polyamide resin, a polyimide resin, a polyester resin, a polyether resin, a polycarbonate resin, a cellulose derivative resin, and the like.

Among them, the fluorine-containing resin, the hydrocarbon-based thermoplastic resin, the acrylic resin, the polyurethane resin, the polycarbonate resin, and the cellulose derivative resin are preferred, and, since the affinity to the inorganic solid electrolyte is favorable, and the flexibility of the resins is favorable, the acrylic resin and the polyurethane resin are particularly preferred.

These resins may be used singly or two or more reins may be used in combination.

The shape of the binder is not particularly limited, may be a particle shape or an irregular shape in the all-solid state secondary battery, and is preferably a particle shape.

Meanwhile, as the binder that is used in the present invention, a commercially available product can be used. In addition, the binder can also be prepared using an ordinary method.

The moisture concentration of the binder that is used in the present invention is preferably 100 ppm (mass-based) or less.

In addition, the binder that is used in the present invention may be used in a solid state or may be used in a state of a polymer particle dispersion liquid or a polymer solution.

The mass-average molecular weight of the binder that is used in the present invention is preferably 5,000 or more, more preferably 10,000 or more, and still more preferably 30,000 or more. The upper limit is realistically 1,000,000 or less, and an aspect in which a binder having a mass-average molecular weight in this range is crosslinked is also preferred.

—Measurement of Molecular Weight—

In the present invention, unless particularly otherwise described, the molecular weight of the binder refers to a mass-average molecular weight, and a standard polystyrene-equivalent mass-average molecular weight is measured by gel permeation chromatography (GPC).

Regarding a measurement method, the molecular weight is a value measured using a method under the following conditions. However, an appropriate eluent may be appropriately selected and used depending on the kind of the binder.

(Conditions)

Column: A column obtained by connecting TOSOH TSK-gel SuperHZM-H (trade name), TOSOH TSKgel SuperHZ4000 (trade name), and TOSOH TSKgel SuperHZ2000 (trade name) is used.

Carrier: Tetrahydrofuran

Measurement temperature: 40° C.

Carrier flow rate: 1.0 mL/min

Concentration of specimen: 0.1% by mass

Detector: Refractive index (RI) detector

In a case in which a decrease in the interface resistance and the maintenance of the decreased interface resistance in the case of being used in the all-solid state secondary battery are taken into account, the content of the binder in the negative electrode active material layer 2, the solid electrolyte layer 3, or the positive electrode active material layer 4 is preferably 0.01% by mass or more, more preferably 0.1% by mass or more, and still more preferably 1% by mass or more. From the viewpoint of battery characteristics, the upper limit is preferably 20% by mass or less, more preferably 10% by mass or less, and still more preferably 5% by mass or less.

The respective layers constituting the all-solid state secondary battery of the embodiment of the present invention may include a conductive auxiliary agent, a dispersant, and a lithium salt as long as the effect of the present invention is not impaired.

—Collector (Metal Foil)—

The positive electrode collector 5 and the negative electrode collector 1 are preferably an electron conductor.

In the present invention, there are cases in which any or both of the positive electrode collector and the negative electrode collector will be simply referred to as the collector.

As a material forming the positive electrode collector, aluminum, an aluminum alloy, stainless steel, nickel, titanium, or the like, and furthermore, a material obtained by treating the surface of aluminum or stainless steel with carbon, nickel, titanium, or silver (a material forming a thin film) is preferred, and, among these, aluminum and an aluminum alloy are more preferred.

As a material forming the negative electrode collector, aluminum, copper, a copper alloy, stainless steel, nickel, titanium, or the like, and furthermore, a material obtained by treating the surface of aluminum, copper, a copper alloy, or stainless steel with carbon, nickel, titanium, or silver is preferred, and aluminum, copper, a copper alloy, or stainless steel is more preferred.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 to 500 µm. In addition, the surface of the collector is preferably provided with protrusions and recesses by means of a surface treatment.

In the present invention, a functional layer, member, or the like may be appropriately interposed or disposed between the respective layers of the negative electrode collector 1, the negative electrode active material layer 2, the solid electrolyte layer 3, the positive electrode active material layer 4, and the positive electrode collector 5. In addition, the respective layers may be composed of a single layer or multiple layers.

The all-solid state secondary battery in which one all-solid state secondary battery laminate 10 is coated with the exterior material layer has been described, but the all-solid state secondary battery of the embodiment of the present invention is not limited thereto, and, for example, an all-solid state secondary battery in which a plurality of all-solid state secondary battery laminates 10 is integrally coated with the exterior material layer is also included in the scope of the present invention.

[Usages of all-Solid State Secondary Battery]

The all-solid state secondary battery of the embodiment of the invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, portable tape recorders, radios, backup power supplies, memory cards, and the like. Additionally, examples of consumer usages include vehicles (electric cars and the like), electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military usages and universe usages. In addition, the all-solid state secondary battery can also be combined with solar batteries. Among them, the all-solid state secondary battery is preferably used in vehicles, electric vehicles, motors, watches, cameras, medical devices, and mobile phones, in which a strong vibrations are applied to the all-solid state secondary battery during use thereof, and more preferably used in vehicles, electric vehicles, medical devices, and mobile phones.

All-solid state secondary batteries refer to secondary batteries having a positive electrode, a negative electrode, and an electrolyte which are all composed of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery. All-solid state secondary batteries are classified into organic (polymer) all-solid state secondary batteries in which a polymer compound such as polyethylene oxide is used as an electrolyte and inorganic all-solid state secondary batteries in which the Li—P—S-based glass, LLT, LLZ, and the like are used. Meanwhile, the application of organic compounds to inorganic all-solid state secondary batteries is not inhibited, and organic compounds can also be applied as binders or additives of positive electrode active materials, negative electrode active materials, and inorganic solid electrolytes.

Inorganic solid electrolytes are differentiated from electrolytes in which the above-described polymer compound is used as an ion conductive medium (polymer electrolyte), and inorganic compounds serve as ion conductive media. Specific examples thereof include the Li—P—S glass, LLT, and LLZ. Inorganic solid electrolytes do not deintercalate positive ions (Li ions) and exhibit an ion transportation function. In contrast, there are cases in which materials serving as an ion supply source which is added to electrolytic solutions or solid electrolyte layers and deintercalates positive ions (Li ions) are referred to as electrolytes. However, in the case of being differentiated from electrolytes as the ion transportation materials, the materials are referred to as "electrolyte salts" or "supporting electrolytes". Examples of the electrolyte salts include LiTFSI.

In the present invention. "compositions" refer to mixtures obtained by uniformly mixing two or more components. Here, compositions may partially include agglomeration or uneven distribution as long as the compositions substantially maintain uniformity and exhibit desired effects.

EXAMPLES

Hereinafter, the present invention will be described in more detail on the basis of examples. Meanwhile, the present invention is not interpreted to be limited thereto. "Parts" and "/%" that represent compositions in the following examples are mass-based unless particularly otherwise described. In addition, "room temperature" refers to 25° C.

—Synthesis of Sulfide-Based Inorganic Solid Electrolyte (Li—P—S-Based Glass)—

A sulfide-based inorganic solid electrolyte was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a globe box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, injected into an agate mortar, and mixed using an agate muddler for five minutes. Meanwhile, the molar ratio of $Li_2S$ and $P_2S_5$ was set to $Li_2S:P_2S_5=75:25$.

Sixty six zirconia beads having a diameter of 5 mm were injected into a 45 mL zirconia container (manufactured by Fritsch Japan Co., Ltd.), the total amount of the mixture of the lithium sulfide and the diphosphorus pentasulfide was injected thereinto, and the container was sealed in an argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours, thereby obtaining yellow powder (6.20 g) of a sulfide-based inorganic solid electrolyte (Li—P—S-based glass).

—Preparation of Composition for Positive Electrode (P-1)—

One hundred eighty zirconia beads having a diameter of 5 mm were injected into a 45 mL zirconia container (manufactured by Fritsch Japan Co., Ltd.), and the Li—P—S-based glass (3.0 g) synthesized above and heptane (12.3 g) as a dispersion medium were injected thereinto. The container was set in a planetary ball mill P-7 (trade name) manufactured by Fritsch Japan Co., Ltd., and the components were mixed together at a temperature of 25° C. and a rotation speed of 300 rpm for two hours. After that, LCO ($LiCoO_2$, manufactured by Japan Chemical Industry Association) (7.0 g) was injected into the container as an active material, similarly, the container was set in a planetary ball mill P-7, the components were continuously mixed together at a temperature of 25° C. and a rotation speed of 100 rpm for 10 minutes, thereby preparing a composition for a positive electrode (P-1).

Compositions for a positive electrode shown in Table 1 were prepared in the same manner as the composition for a positive electrode (P-1) except for the fact that the composition was changed as shown in Table 1.

TABLE 1

| Composition for positive electrode | Inorganic solid electrolyte | | Positive electrode active material | | Binder | | Dispersion medium | |
|---|---|---|---|---|---|---|---|---|
| | Kind | Added amount (g) | Kind | Added amount (g) | Kind | Added amount (g) | Kind | Added amount (g) |
| P-1 | Li—P—S | 3.0 | LCO | 7.0 | — | — | | 12.3 |
| P-2 | Li—P—S | 2.7 | LCO | 7.0 | UF-20S | 0.3 | | 12.3 |
| P-3 | Li—P—S | 1.9 | LCO | 8.0 | UF-20S | 0.1 | | 12.3 |
| P-4 | LLZ | 2.7 | LCO | 7.0 | UF-20S | 0.3 | | 12.3 |
| P-5 | LLT | 3.5 | NMC | 6.0 | PVdF-HFP | 0.5 | | 12.3 |
| P-6 | Li—P—S | 2.7 | NMC | 7.0 | UF-20S | 0.3 | | 12.3 |

<Notes of table>
Li—P—S: Li—P—S-based glass synthesized above
LLZ: $Li_7La_3Zr_2O_{12}$ (manufactured by Toshima Manufacturing Co., Ltd.)
LLT: $Li_{0.33}La_{0.55}TiO_3$ (manufactured by Toshima Manufacturing Co., Ltd.)
LCO: $LiCoO_2$ (manufactured by Japan Chemical Industry Association)
NMC: $LiNi_{0.33}Co_{0.33}Mn_{0.33}O_2$ (manufactured by Aldrich-Sigma, Co. LLC.)
PVdF-HFP: Polyvinylidene fluoride-hexafluoropropylene copolymer (manufactured by Arkema K.K., trade name "KYNARFLEX2500-20")
UF-20S: Trade name, FLO_THENE UF-20S (manufactured by Sumitomo Seika Chemicals Co., Ltd., polyethylene powder, average particle diameter: 20 μm)

—Preparation of Composition for Negative Electrode (N-1)—

One hundred eighty zirconia beads having a diameter of 5 mm were injected into a 45 mL zirconia container (manufactured by Fritsch Japan Co., Ltd.), and the Li—P—S-based glass (4.0 g) synthesized above and heptane (12.3 g) as a dispersion medium were injected thereinto. The container was set in a planetary ball mill P-7 (trade name) manufactured by Fritsch Japan Co., Ltd., and the components were mixed together at a temperature of 25° C. and a rotation speed of 300 rpm for two hours. After that, CGB20 (trade name, manufactured by Nippon Graphite) (6.0 g) was injected into the container as an active material, similarly, the container was set in a planetary ball mill P-7, the components were continuously mixed together at a temperature of 25° C. and a rotation speed of 200 rpm for 15 minutes, thereby preparing a composition for a negative electrode (N-1).

Compositions for a negative electrode shown in Table 2 were prepared in the same manner as the composition for a negative electrode (N-1) except for the fact that the composition was changed as shown in Table 2.

TABLE 2

| Composition for negative electrode | Inorganic solid electrolyte | | Positive electrode active material | | Binder | | Dispersion medium | |
|---|---|---|---|---|---|---|---|---|
| | Kind | Added amount (g) | Kind | Added amount (g) | Kind | Added amount (g) | Kind | Added amount (g) |
| N-1 | Li—P—S | 4.0 | CGB20 | 6.0 | — | — | | 12.3 |
| N-2 | Li—P—S | 3.7 | CGB20 | 6.0 | PVdF-HFP | 0.3 | | 20 |
| N-3 | Li—P—S | 3.9 | CGB20 | 6.0 | UF-20S | 0.1 | | 20 |
| N-4 | LLZ | 3.7 | CGB20 | 6.0 | UF-20S | 0.3 | | 20 |
| N-5 | LLT | 3.9 | CGB20 | 6.0 | PVdF-HFP | 0.1 | | 20 |
| N-6 | Li—P—S | 3.7 | Sn | 6.0 | UF-20S | 0.3 | | 20 |

<Notes of table>
Li—P—S: Li—P—S-based glass synthesized above
LLZ: $Li_7La_3Zr_2O_{12}$ (manufactured by Toshima Manufacturing Co., Ltd.)
LLT: $Li_{0.33}La_{0.55}TiO_3$ (manufactured by Toshima Manufacturing Co., Ltd.)
CGB20: Trade name, negative electrode active material manufactured by Nippon Graphite, volume-average particle diameter: 20 μm
Sn: Manufactured by Aldrich-Sigma, Co. LLC., volume-average particle diameter: 10 μm
PVdF-HFP: Polyvinylidene fluoride-hexafluoropropylene copolymer (manufactured by Arkema K.K., trade name "KYNARFLEX2500-20")
UF-20S: Trade name, FLO_THENE UF-20S (manufactured by Sumitomo Seika Chemicals Co., Ltd., polyethylene powder, average particle diameter: 20 μm)

—Preparation of Solid Electrolyte Composition (E-1)—

One hundred eighty zirconia beads having a diameter of 5 mm were injected into a 45 mL zirconia container (manufactured by Fritsch Japan Co., Ltd.), and the Li—P—S-based glass (10.0 g) synthesized above and heptane (15.0 g) as a dispersion medium were injected thereinto. After that, the container was set in a planetary ball mill P-7 manufactured by Fritsch Japan Co., Ltd., and the components were continuously stirred at a temperature of 25° C. and a rotation speed of 300 rpm for two hours, thereby preparing a solid electrolyte composition (E-1).

Solid electrolyte compositions shown in Table 3 were prepared in the same manner as the solid electrolyte composition (E-1) except for the fact that the inorganic solid electrolyte, the binder, and the dispersion medium were changed to constitutions shown in Table 3.

TABLE 3

| Composition for solid electrolyte | Inorganic solid electroyte | | Binder | | Dispersion medium | |
|---|---|---|---|---|---|---|
| | Kind | Added amount (g) | Kind | Added amount (g) | Kind | Added amount (g) |
| E-1 | Li—P—S | 10.0 | — | — | | 15.0 |
| E-2 | Li—P—S | 9.7 | PVdF-HFP | 0.3 | | 15.0 |
| E-3 | Li—P—S | 9.9 | UF-20S | 0.1 | | 15.0 |

TABLE 3-continued

| Composition for solid electrolyte | Inorganic solid electroyte | | Binder | | Dispersion medium | |
|---|---|---|---|---|---|---|
| | Kind | Added amount (g) | Kind | Added amount (g) | Kind | Added amount (g) |
| E-4 | LLZ | 9.7 | PVdF-HFP | 0.3 | | 15.0 |
| E-5 | LLT | 9.7 | UF-20S | 0.3 | | 15.0 |

<Notes of table>
Li—P—S: Li—P—S-based glass synthesized above
LLZ: $Li_7La_3Zr_2O_{12}$ (manufactured by Toshima Manufacturing Co., Ltd.)
LLT: $Li_{0.33}La_{0.55}TiO_3$ (manufactured by Toshima Manufacturing Co., Ltd.)
PVdF-HFP: Polyvinylidene fluoride-hexafluoropropylene copolymer (manufactured by Arkema K.K., trade name "KYNARFLEX2500-20")
UF-20S: Trade name, FLO_THENE UF-20S (manufactured by Sumitomo Seika Chemicals Co., Ltd., polyethylene powder, average particle diameter: 20 μm)

—Production of Negative Electrode Sheet for all-Solid State Secondary Battery—

The composition for a negative electrode (N-1) prepared above was applied onto a 20 μm-thick copper foil using an applicator (trade name: SA-201 Baker-type applicator, manufactured by Tester Sangyo Co., Ltd.), heated at 80° C. for one hour, and then further dried at 110° C. for one hour. After that, the composition was heated (at 120° C.) and pressurized (at 20 MPa for one minute) using a heat press, thereby producing a negative electrode sheet for an all-solid state secondary battery having a laminate structure of a negative electrode active material layer and the copper foil.

The solid electrolyte composition (E-1) prepared above was applied onto the negative electrode active material layer using the applicator, heated at 80° C. for one hour, and then further dried at 110° C. for six hours. A sheet having a solid electrolyte layer formed on the negative electrode active material layer was heated (at 120° C.) and pressurized (at 30 MPa for one minute) using the heat press, thereby producing a negative electrode sheet for an all-solid state secondary battery having a laminate structure of the solid electrolyte layer, the negative electrode active material layer, and the copper foil.

—Production of Positive Electrode Sheet for all-Solid State Secondary Battery—

The composition for a positive electrode (P-1) prepared above was applied onto a 20 μm-thick aluminum foil using the applicator, heated at 80° C. for one hour, and then further dried at 110° C. for one hour. After that, the composition was heated (at 120° C.) and pressurized (at 20 MPa for one minute) using the heat press, thereby producing a positive electrode sheet for an all-solid state secondary battery having a laminate structure of a positive electrode active material layer and the aluminum foil.

—Production of Laminate for all-Solid State Secondary Battery (L-1)—

A 22 mm×22 mm square piece was cut out from the negative electrode sheet for an all-solid state secondary battery having the solid electrolyte layer on the negative electrode active material layer produced above. On the other hand, a 20 mm×20 mm square piece was cut out from the positive electrode sheet for an all-solid state secondary battery produced above. The positive electrode sheet for an all-solid state secondary battery and the solid electrolyte layer were disposed so that the positive electrode active material layer and the solid electrolyte layer faced each other, and then heated (at 120° C.) and pressurized (at 40 MPa for one minute) using the heat press, thereby producing a laminate for an all-solid state secondary battery (L-1) having a laminate structure of the aluminum foil, the positive electrode active material layer, the solid electrolyte layer, the negative electrode active material layer, and the copper foil.

Laminates for an all-solid state secondary battery shown in Table 4 were produced in the same manner as the laminate for an all-solid state secondary battery (L-1) except for the fact that the layer constitution was changed as shown in Table 4.

TABLE 4

| | Positive electrode | | | Solid electrolyte layer | | Negative electrode | | |
|---|---|---|---|---|---|---|---|---|
| Laminate | Kind | Weight per unit area (mg/cm$^2$) | Layer thickness (μm) | Kind | Layer thickness (μm) | Kind | Weight per unit area (mg/cm$^2$) | Layer thickness (μm) |
| L-1 | P-1 | 13 | 40 | E-1 | 25 | N-1 | 8 | 39 |
| L-2 | P-2 | 15 | 41 | E-2 | 28 | N-2 | 9 | 40 |
| L-3 | P-3 | 13 | 39 | E-2 | 25 | N-2 | 9 | 40 |
| L-4 | P-4 | 15 | 41 | E-4 | 100 | N-4 | 9 | 40 |
| L-5 | P-5 | 13 | 35 | E-5 | 100 | N-5 | 8 | 35 |
| L-6 | P-6 | 13 | 40 | E-3 | 30 | N-3 | 8 | 38 |
| L-7 | P-3 | 26 | 60 | E-3 | 25 | N-6 | 8 | 35 |

—Manufacturing of all-Solid State Secondary Battery of Test No. 101—

A collecting terminal for a positive electrode and a collecting terminal for a negative electrode which had a thickness of 100 μm, a width of 5 mm, and a length of 20 mm were disposed on non-composition-applied portions (surfaces on which the electrode active material layer was not formed) of the copper foil and the aluminum foil of the laminate for an all-solid state secondary battery (L-1) produced above. An aluminum collecting terminal for a positive electrode and a nickel collecting terminal for a negative electrode were used. In a state in which the laminate for an all-solid state secondary battery L-1 was sandwiched using two 1 mm-thick 30 mm×30 mm square butyl rubber sheets having a polyethylene thermally-fused layers as an exterior material layer, the ambient environment pressure was reduced while pressurizing the laminate L-1 (at 20 MPa), and the surplus polyethylene thermally-fused layers on the butyl rubber sheets were adhered together, thereby sealing four side surfaces. An all-solid state secondary battery of Test No. 101 having the constitution illustrated in FIG. 1 was obtained in the above-described manner. The collecting terminals of the all-solid state secondary battery of Test No. 101 were kept to be tightly sealed through the thermally-fused layers of the exterior material layer, whereby the collecting terminals could be ensured to be electrically conductive with the battery.

All-solid state secondary batteries of Test Nos. 102 to 118 and c01 to c04 shown in Table 5 were manufactured in the same manner as the all-solid state secondary battery of Test No. 101.

TABLE 5

| | | | Exterior material layer | | | | | |
|---|---|---|---|---|---|---|---|---|
| | | | | Gas transmission | Modulus of | Tensile | Manufacturing condition | |
| Sample No | Laminate Kind | Type | Thickness (μm) | rate (cc · 20 μm/ m² · 24 h · atm) | elasticity (MPa) | strength (Mpa) | Com-pression | Decom-pression |
| 101 | L-1 | Butyl rubber sheet | 1,000 | 2.2 | 0.8 | 8.1 | 20 MPa | Yes |
| 102 | L-2 | Butyl rubber sheet | 1,000 | 2.2 | 0.8 | 8.1 | 20 MPa | Yes |
| 103 | L-3 | Butyl rubber sheet | 1,000 | 2.2 | 0.8 | 8.1 | 20 MPa | Yes |
| 104 | L-4 | Butyl rubber sheet | 1,000 | 2.2 | 0.8 | 8.1 | 20 MPa | Yes |
| 105 | L-5 | Butyl rubber sheet | 1,000 | 2.2 | 0.8 | 8.1 | 20 MPa | Yes |
| 106 | L-6 | Butyl rubber sheet | 1,000 | 2.2 | 0.8 | 8.1 | 20 MPa | Yes |
| 107 | L-7 | Butyl rubber sheet | 1,000 | 2.2 | 0.8 | 8.1 | 20 MPa | Yes |
| 108 | L-2 | Butyl rubber sheet | 100 | 2.2 | 0.8 | 8.1 | 20 MPa | Yes |
| 109 | L-2 | Butyl rubber sheet | 20 | 2.2 | 0.8 | 8.1 | 20 MPa | Yes |
| 110 | L-2 | chloroprene rubber sheet | 3,500 | 7.7 | 1.7 | 8.4 | 20 MPa | Yes |
| 111 | L-2 | Fluorine rubber sheet | 3,000 | 6.9 | 2.1 | 12.8 | 20 MPa | Yes |
| 112 | L-2 | Nitrile rubber sheet | 800 | 1.6 | 1.2 | 7 | 20 MPa | Yes |
| 113 | L-2 | Butyl rubber sheet | 1,000 | 2.2 | 0.8 | 8.1 | No | Yes |
| 114 | L-2 | Butyl rubber sheet | 1,000 | 2.2 | 0.8 | 8.1 | 20 MPa | No |
| 115 | L-2 | Chlorinated butyl rubber sheet | 1,000 | 2.3 | 1.0 | 8.5 | 20 MPa | No |
| 116 | L-7 | Butyl rubber sheet A | 15,000 | 35 | 0.4 | 5.2 | 20 MPa | Yes |
| 117 | L-7 | Butyl rubber sheet at upper surface/aluminum laminate sheet at lower surface/Butyl rubber sheet at lateral side | 1,000/100/1,000 | 2.2/0.5/2.2 | 0.8/2,800/0.8 | 8.1/50/8.1 | 20 MPa | Yes |
| 118 | L-7 | Butyl rubber sheet at upper surface/aluminum laminate sheet at lower surface/aluminum laminate sheet at lateral side | 1,000/100/100 | 2.2/0.5/0.5 | 0.8/2,800/2,800 | 8.1/50/50 | 20 MPa | Yes |
| c01 | L-1 | Aluminum laminated sheet | 100 | 0.5 | 2,800 | 50 | No | Yes |
| c02 | L-1 | Silicone rubber sheet | 20,000 | 1,700 | 0.6 | 5.9 | No | Yes |
| c03 | L-1 | SBR sheet | 1,000 | 41.5 | 0.3 | 3 | No | Yes |
| c04 | L-1 | Epoxy resin sheet | 1,000 | 3.5 | 2,400 | 30 | No | No |

<Notes of table>
Blend rubber sheet A: A sheet obtained by blending 20% by mass of nitrile rubber into an SBR sheet.
Aluminum laminate sheet: A laminate film of an aluminum sheet and a polyethylene terephthalate sheet (the thickness of the aluminum sheet and the thickness of the polyethylene terephthalate sheet = 30:70), the polyethylene thermally-fused layer was provided on the aluminum sheet. In addition, an adhesion layer was provided in an interface between the respective sheets.
SBR: Styrene butadiene rubber <Gas Transmission Coefficient>

The gas transmission coefficient was measured according to JIS K6275-1 (2009). The unit of the gas transmission coefficient: cc·20 μm/(m²·24 h·atm) indicates the amount of gas being transmitted through a sheet area of 1 m² at a pressure of 1 atm for 24 hours in a case in which the thickness of a sheet being measured is 20 μm. Nitrogen gas was measured at 25° C. as a measurement subject.

<Modulus of Elasticity>

The modulus of elasticity was measured under a condition according to JIS K6251-1993. That is, among dumbbell-shaped test specimens, a No. 3-type test specimen was used, the test specimen was set in a tensile tester and tested at an ambient temperature of 25° C. and a tensile rate of 500 mm/min, and the modulus of elasticity was computed from tensile stress, tensile strain, and the cross-sectional area of the test specimen.

<Tensile Strength>

The tensile strength was measured under a condition according to JIS K6251-1993. That is, among dumbbell-shaped test specimens, a No. 3-type test specimen was used, the test specimen was set in a tensile tester and tested at an ambient temperature of 25° C. and a tensile rate of 500 mm/min. and the maximum tensile strength at which the test specimen broke was scanned and regarded as the tensile strength.

—Measurement of Discharge Capacity Density—

The all-solid state secondary battery manufactured above was measured using a charging and discharging evaluation device "TOSCAT-3000 (trade name)" manufactured by Toyo System Co., Ltd. The all-solid state secondary battery was charged at a current value of 0.2 mA until the battery voltage reached 4.2 V and then discharged at a current value of 0.2 mA until the battery voltage reached 3.0 V. These charging and discharging were regarded as one cycle. This cycle was repeated, and the discharge capacity at the third cycle was regarded as the discharge capacity of the all-solid state secondary battery. A value obtained by dividing this discharge capacity by the mass of the battery including the exterior material layer was regarded as the discharge capacity density. A discharge capacity density of 5 Wh/kg or more is the pass level of the present test.

—Voltage after Vibration Test—

The all-solid state secondary battery manufactured above was measured using a charging and discharging evaluation device "TOSCAT-3000 (trade name)" manufactured by Toyo System Co., Ltd. The all-solid state secondary battery was charged at a current value of 0.2 mA until the battery voltage reached 4.2 V. The charged all-solid state secondary battery was set in a vibration tester so as to be parallel to an electrode-laminated surface, and a vibration test was carried out under a condition according to JIS-D-1601 which is a vibration testing method for automobile parts. That is, in the vibration durability test (Section 5.3), a vibration test was carried out under conditions of a level 30, a frequency of 33 Hz, and a vibration acceleration of 30 m/s$^2$, then, the voltage of the all-solid state secondary battery was measured, and the voltage after the vibration test was evaluated using the following evaluation standards. Evaluations of C or higher are the pass level of the present test.

(Evaluation Standards)
A: 4.0 V or more
B: 3.9 V or more and less than 4.0 V
C: 3.8 V or more and less than 3.9 V
D: 3.7 V or more and less than 3.8 V
E: Less than 3.7 V —Evaluation of Cycle Characteristic after Vibration Test—

The cycle characteristic of the all-solid state secondary battery that has been subjected to the vibration test carried out above was measured using a charging and discharging evaluation device "TOSCAT-3000 (trade name)" manufactured by Toyo System Co., Ltd. The all-solid state secondary battery was charged at a current value of 0.2 mA until the battery voltage reached 4.2 V and then discharged at a current value of 0.2 mA until the battery voltage reached 3.0 V. These charging and discharging were regarded as one cycle. This cycle was repeated until the discharge capacity reached less than 80% of the discharge capacity of the third cycle. The cycle characteristic was evaluated from the number of times of the cycle during which the discharge capacity that was 80% or more of the discharge capacity of the third cycle according to the following evaluation standards. The cycle characteristics C or higher are the pass level of the present test.

(Evaluation Standards)
A: 50 Times or more
B: 40 Times or more and less than 50 times
C: 30 Times or more and less than 40 times
D: 10 Times or more and less than 30 times
E: Less than 10 times

TABLE 6

| Sample No. | Discharge capacity density (Wh/kg) | Voltage after vibration test | Cycle characteristic after vibration test |
|---|---|---|---|
| 101 | 15.3 | A | B |
| 102 | 19.5 | A | A |
| 103 | 19.5 | A | A |
| 104 | 8.3 | C | C |
| 105 | 8.8 | C | c |
| 106 | 16.2 | A | A |
| 107 | 36.3 | A | A |
| 108 | 73.8 | A | B |
| 109 | 101.2 | B | C |
| 110 | 9.3 | A | B |
| 111 | 9.8 | A | B |
| 112 | 26.1 | A | A |
| 113 | 16.8 | A | A |
| 114 | 16.5 | A | B |
| 115 | 17.5 | A | A |
| 116 | 7.5 | A | C |
| 117 | 55.5 | B | A |
| 118 | 55.0 | C | B |
| c01 | 68.1 | E | E |
| c02 | 1.1 | D | E |
| c03 | 3.2 | D | D |
| c04 | 17.7 | E | E |

As is clear from Table 6, the all-solid state secondary batteries of Test Nos. c01 to c04 not having the exterior material layer defined by the present invention failed in both a drop in the battery voltage after the vibration test and the cycle characteristic. In Test No. c03, it is considered that the gas transmission coefficient was high, and gas including water vapor of the outside environment of the battery intruded into the battery, whereby the battery material deteriorated, and thus the all-solid state secondary battery failed in the discharge capacity density.

In contrast, the all-solid state secondary batteries of the present invention of Nos. 101 to 118 passed in both a drop in the battery voltage after the vibration test and the cycle characteristic.

In addition, from the comparison between Test Nos. 102 and 104, it is found that the all-solid state secondary battery of the embodiment of the present invention in which the sulfide-based inorganic solid electrolyte was used was capable of preventing the contact with gas, particularly, the contact with gas intruding from the interface between the active material and the sulfide-based inorganic solid electrolyte and, furthermore, capable of suppressing a drop in the battery voltage after the vibration test assuming actual travelling and the degradation of the cycle characteristic to the same extent as the all-solid state secondary battery of the embodiment of the present invention in which the oxide-based inorganic solid electrolyte was used.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

EXPLANATION OF REFERENCES

1: negative electrode collector
2: negative electrode active material layer
3: solid electrolyte layer
4: positive electrode active material layer
5: positive electrode collector
6: collecting terminal
7: exterior material layer
10: all-solid state secondary battery laminate
100: all-solid state secondary battery

What is claimed is:

1. An all-solid state secondary battery comprising:
a positive electrode active material layer;
a negative electrode active material layer; and
a solid electrolyte layer;
wherein the all-solid state secondary battery is coated with an exterior material layer, and at least a part of the exterior material layer is a rubber-coating layer having a gas transmission coefficient of 7.7 cc·20 μm/m$^2$·24 h·atm or less,
wherein a thickness of the rubber-coating layer is 50 to 5,000 μm, and at least a part of a side surface of the all-solid state secondary battery is coated with the rubber-coating layer,
wherein a modulus of elasticity at 25° C. of rubber constituting the rubber-coating layer is 0.5 to 5 MPa, and
wherein inorganic solid electrolytes included in the positive electrode active material layer, the negative electrode active material layer and the solid electrolyte layer are sulfide-based inorganic solid electrolytes.

2. The all-solid state secondary battery according to claim 1, wherein a thickness of the exterior material layer is 1 to 100,000 μm.

3. The all-solid state secondary battery according to claim 1, wherein a tensile strength at 25° C. of the rubber constituting the rubber-coating layer is 0.1 to 100 MPa.

4. An exterior material for an all-solid state secondary battery comprising:
a rubber-coating layer having a gas transmission coefficient of 7.7 cc·20 μm/m$^2$·24 h·atm or less,
wherein a thickness of the rubber-coating layer is 50 to 5,000 μm, and at least a part of a side surface of the all-solid state secondary battery is coated with the rubber-coating layer,
wherein a modulus of elasticity at 25° C. of rubber constituting the rubber-coating layer is 0.5 to 5 MPa.

5. A method for manufacturing the all-solid state secondary battery according to claim 1, the method comprising:
a step of reducing a pressure in a space between a laminate having the positive electrode active material layer, the negative electrode active material layer, and the solid electrolyte layer, and an exterior material layer disposed around the laminate such that an end portion of the exterior material layer is adhered to the laminate to seal the all-solid state secondary battery in a state in which the exterior material layer and the laminate are attached to each other,
wherein at least a part of the exterior material layer is a rubber-coating layer having a gas transmission coefficient of 7.7 cc·20 μm/m$^2$·24 h·atm or less, and a modulus of elasticity at 25° C. of rubber constituting the rubber-coating layer is 0.5 to 5 MPa,
wherein a thickness of the rubber-coating layer is 50 to 5,000 μm, and at least a part of a side surface of the all-solid state secondary battery is coated with the rubber-coating layer.

6. The all-solid state secondary battery according to claim 1, wherein the gas transmission coefficient of the rubber-coating layer is 0.1 to 7.7 cc·20 μm/m$^2$·24 h·atm.

7. The exterior material for an all-solid state secondary battery according to claim 4, wherein the gas transmission coefficient of the rubber-coating layer is 0.1 to 7.7 cc·20 μm/m$^2$·24 h·atm.

8. The exterior material for an all-solid state secondary battery according to claim 4, wherein a tensile strength at 25° C. of the rubber constituting the rubber-coating layer is 0.1 to 100 MPa.

9. The method for manufacturing the all-solid state secondary battery according to claim 5,
wherein the modulus of elasticity at 25° C. of the rubber constituting the rubber-coating layer is 0.8 to 2.1 MPa.

10. The method for manufacturing the all-solid state secondary battery according to claim 5, wherein the rubber-coating layer has a gas transmission coefficient of 0.1 to 7.7 cc·20 μm/m$^2$·24 h·atm, and
wherein the modulus of elasticity at 25° C. of the rubber constituting the rubber-coating layer is 0.8 to 2.1 MPa.

11. The method for manufacturing the all-solid state secondary battery according to claim 5,
wherein the modulus of elasticity at 25° C. of the rubber constituting the rubber-coating layer is 0.8 to 2.1 MPa, and
wherein a tensile strength at 25° C. of the rubber constituting the rubber-coating layer is 0.1 to 100 MPa.

12. The all-solid state secondary battery according to claim 1, wherein the modulus of elasticity at 25° C. of the rubber constituting the rubber-coating layer is 0.8 to 2.1 MPa.

13. The exterior material for an all-solid state secondary battery according to claim 4, wherein the modulus of elasticity at 25° C. of the rubber constituting the rubber-coating layer is 0.8 to 2.1 MPa.

14. The exterior material for an all-solid state secondary battery according to claim 1, wherein in the side surface of the all-solid state secondary battery, at least all of the positive electrode active material layer, the negative electrode active material layer and a side surface of the solid electrolyte layer are coated with the exterior material layer, wherein the exterior material layer is the rubber-coating layer having the gas transmission coefficient of 7.7 cc·20 μm/m$^2$·24 h·atm or less.

* * * * *